(12) United States Patent
Yamamoto et al.

(10) Patent No.: US 10,200,576 B2
(45) Date of Patent: Feb. 5, 2019

(54) ROTATABLE-SWINGABLE INPUT DEVICE AND ELECTRONIC APPARATUS EQUIPPED WITH THE SAME

(71) Applicant: CANON KABUSHIKI KAISHA, Tokyo (JP)

(72) Inventors: Jiro Yamamoto, Chofu (JP); Keita Iwai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/013,038

(22) Filed: Jun. 20, 2018

(65) Prior Publication Data

US 2018/0302537 A1    Oct. 18, 2018

Related U.S. Application Data

(62) Division of application No. 15/333,355, filed on Oct. 25, 2016, now Pat. No. 10,091,400.

(30) Foreign Application Priority Data

Nov. 2, 2015  (JP) ................................. 2015-215757
Nov. 2, 2015  (JP) ................................. 2015-215758

(51) Int. Cl.
*H04N 5/225*   (2006.01)
*H04N 1/00*    (2006.01)
(Continued)

(52) U.S. Cl.
CPC ........ *H04N 5/2251* (2013.01); *H01H 25/041* (2013.01); *H04N 1/004* (2013.01);
(Continued)

(58) Field of Classification Search
CPC ............. H04N 5/2251; H04N 1/00384; H04N 1/00387; H04N 1/00397; H04N 1/004;
(Continued)

(56) References Cited

U.S. PATENT DOCUMENTS 5,283,606 A    2/1994  Konno et al.
6,683,653 B1   1/2004  Miyake et al.
(Continued)

FOREIGN PATENT DOCUMENTS

JP    2003-296006 A    10/2003
JP    3820548 B2       9/2006
(Continued)

*Primary Examiner* — Daniel M Pasiewicz
(74) *Attorney, Agent, or Firm* — Venable LLP

(57) ABSTRACT

A rotatable-swingable input device that has high reliability at low cost and that improves operability. Optical sensors, an elastically deformable holder, and switches are disposed on a wiring board. A shading member has a plurality of shading parts that are arranged in a circumferential direction and pass a space between a light projecting section and a light receiving section of the optical sensor when an operation member is rotated. A click spring contacts with a concavo-convex part of the operation member to generate click feeling. The holder has an inner annular part holding the operation member and shading member, and an outer annular part having pressure parts each of which deforms and pushes one of the switches when the operation member is swingingly operated. The optical sensors are arranged between the inner annular part and outer annular part without overlapping with the click spring to interpose one of the switches.

6 Claims, 14 Drawing Sheets

(51) Int. Cl.
*H01H 25/04* (2006.01)
*H01H 3/02* (2006.01)

(52) U.S. Cl.
CPC ....... *H04N 1/00387* (2013.01); *H04N 5/2253* (2013.01); *H04N 5/2254* (2013.01); *H01H 2003/028* (2013.01); *H01H 2025/043* (2013.01)

(58) Field of Classification Search
CPC ............. H01H 2003/028; H01H 25/04; H01H 25/041; H01H 2025/043
See application file for complete search history.

(56) References Cited

U.S. PATENT DOCUMENTS

| | | | |
|---|---|---|---|
| 7,193,166 B2 * | 3/2007 | Sakurai | ................. G05G 9/047 200/5 R |
| 7,297,882 B2 | 11/2007 | Badarneh | |
| 7,319,490 B2 | 1/2008 | Kanamori et al. | |
| 7,462,787 B1 | 12/2008 | Kang et al. | |
| 7,860,237 B2 | 12/2010 | Takashima et al. | |
| 7,991,149 B2 | 8/2011 | Takashima et al. | |
| 8,073,138 B2 | 12/2011 | Takashima et al. | |
| 2004/0170270 A1 | 9/2004 | Takashima et al. | |
| 2005/0122806 A1 | 6/2005 | Arakawa et al. | |
| 2008/0257704 A1 | 10/2008 | Tsuduki | |
| 2009/0251340 A1 | 10/2009 | Arihara | |
| 2009/0301855 A1 | 12/2009 | Kang | |
| 2010/0149127 A1 | 6/2010 | Fisher et al. | |
| 2010/0187083 A1 | 7/2010 | Morrison et al. | |
| 2010/0188372 A1 | 7/2010 | Takashima et al. | |
| 2010/0188373 A1 | 7/2010 | Takashima et al. | |
| 2011/0083952 A1 | 4/2011 | Hu et al. | |
| 2011/0120849 A1 | 5/2011 | Morimoto et al. | |
| 2012/0062522 A1 | 3/2012 | Takashima et al. | |

FOREIGN PATENT DOCUMENTS

| | | |
|---|---|---|
| JP | 2011-142014 A | 7/2011 |
| JP | 5281589 B2 | 9/2013 |

* cited by examiner

ROTATABLE-SWINGABLE INPUT DEVICE AND ELECTRONIC APPARATUS EQUIPPED WITH THE SAME

This application is a division of application Ser. No. 15/333,355 filed Oct. 25, 2016.

BACKGROUND OF THE INVENTION

Field of the Invention

The present invention relates to a rotatable-swingable input device that is disposed in an electronic apparatus including an image pickup apparatus, such as a digital camera, and an electronic apparatus equipped with the rotatable-swingable input device.

Description of the Related Art

There is an electronic apparatus, such as a digital camera, that is provided with a rotatable-swingable input device having an operation dial that allows a combined operation including swinging operations in a plurality of directions and a rotating operation. As a rotation detection means of the rotatable-swingable input device, a technique that detects rotation of an operation dial on the basis of a pulse signal that occurs by sliding a contact brush fixed to the operation dial along with an electrode pattern disposed on a printed circuit board is proposed (see Japanese Patent No. 5281589). In this proposal, when the operation dial is swung, a plunger disposed in the operation dial pushes a switch and a signal is output.

However, since the contact brush always slidably contacts with the electrode pattern when the operation dial is rotated, a continuous operation may wear the electrode pattern and deteriorate operability. Moreover, since wear of the electrode pattern destabilizes a contact state with the contact brush, there are problems in deterioration of an output signal and in durability. Furthermore, there is also a problem that resistance often varies according to the contact state between the contact brush and electrode pattern, which causes chattering, deteriorating reliability.

On the other hand, a technique that detects rotation of an operation dial by a magnet and magnetic field detecting element and that generates a click feeling magnetically by arranging another magnet opposite to the rotating magnet is proposed as a rotation detection means for a rotatable-swingable input device (see Japanese Patent No. 3820548). Since the magnet and magnetic field detecting element are non-contact in this proposal, the inconvenience mentioned above is canceled.

However, since the technique in the above-mentioned Japanese Patent No. 3820548 needs to magnetize a plurality of N poles and S poles to a magnetic substance in high accuracy, a cost increases. Moreover, since the click feeling is generated by magnetic suction and repulsion, it is difficult to obtain satisfactory operational feeling of the operation dial.

On the other hand, a technique that detects rotation of an operation dial using a transmission optical sensor and a shading blade that rotate together with the operation dial by counting shading parts of the shading blade that pass through a gap between a light projecting section and light receiving section of the transmission optical sensor is known as the rotation detection means. The rotation detection means using the transmission optical sensor is excellent in durability because the shading blade does not contact with the transmission type optical sensor, is compact because the shading blade is configured simply, and is configured at low cost because there is no need to use expensive parts.

However, when the transmission type optical sensor is used as the rotation detection means, and when the positional relationship between the shading part of the shading blade and the transmission optical sensor is not suitable in a stable position where the rotation of the operation dial stops, the rotation detection accuracy of the operation dial may be lowered.

For example, since variation of the fixed position of the shading blade to the operation dial or variation of the stable position of the operation dial destabilizes transmission and shading of the transmission optical sensor, the rotation amount and the rotation direction of the operation dial may be misdetected. Moreover, it is necessary to prevent misdetection even if the switch is pressed by swinging the operation dial at the stable position of the shading blade.

SUMMARY OF THE INVENTION

The present invention provides a technique that achieves a rotatable-swingable input device with high reliability at low cost and that improves operability of an operation dial.

Moreover, the present invention provides a technique that prevents a rotation detection means of a rotatable-swingable input device from misdetecting a rotating operation and a swinging operation of an operation dial in a case where a transmission optical sensor is used as a rotation detection means of a rotatable-swingable input device.

Accordingly, a first aspect of the present invention provides a rotatable-swingable input device including a plurality of optical sensors disposed on a wiring board each of which includes a light projecting section and a light receiving section that receives a light flux emitted from the light projecting section, an operation member that enables a rotating operation and swinging operations in a plurality of directions, a plurality of switches that are disposed on the same side of the wiring board where the optical sensors are arranged, each of the switches generating a signal when being pressed by a swinging operation of the operation member, an elastically deformable holder that is disposed on the same side of the wiring board and holds the operation member so as to be rotatable and swingable, and a click spring that contacts with a concavo-convex part disposed on the operation member to generate click feeling when the operation member is rotationally operated. The holder is provided with an inner annular part that holds the operation member so as to be rotatable and swingable in the plurality of directions, and an outer annular part that is arranged outside the inner annular part and has pressure parts each of which deforms elastically and pushes a corresponding switch among the plurality of switches when the operation member is swingingly operated in one direction among the plurality of directions. The optical sensors are arranged at positions between the inner annular part and the outer annular part without overlapping with the click spring so as to interpose one of the switches when viewed in an axial direction of the operation member.

Accordingly, a second aspect of the present invention provides an electronic apparatus that is provided with the rotatable-swingable input device of the first aspect.

Accordingly, a third aspect of the present invention provides a rotatable-swingable input device including a plurality of optical sensors disposed on a wiring board each of which comprises a light projecting section and a light receiving section that receives a light flux emitted from the light projecting section, an operation member that enables a rotating operation and swinging operations in a plurality of directions, a plurality of switches that are disposed on the same side of the wiring board where the optical sensors are arranged, each of the switches generating a signal when being pressed by a swinging operation of the operation member, and a shading member that has a plurality of shading parts that are arranged in a circumferential direction and pass a space between the light projecting section and the light receiving section when the operation member is rotationally operated. The shading parts do not positioned in the space in a rotation stop position of the operation member. A circumferential width of a gap between the shading parts adjacent in the rotation direction is wider than a circumferential width of the space of each of the optical sensors.

Accordingly, a fourth aspect of the present invention provides an electronic apparatus that is provided with the rotatable-swingable input device of the third aspect.

According to the first and second aspects of the present invention, a rotatable-swingable input device with high reliability is achieved at low cost and operability of the operation dial is improved.

According to the third and fourth aspects of the present invention, misdetection of a rotating operation and a swinging operation of the operation dial is prevented in a case where a transmission optical sensor is used as a rotation detection means of a rotatable-swingable input device.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
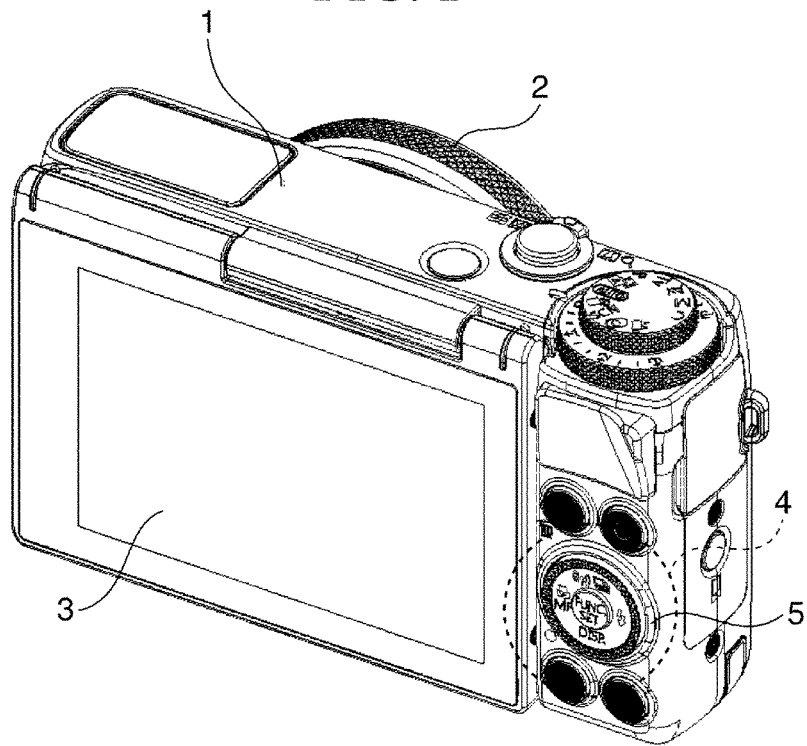
FIG. 1 is a perspective view of a digital camera as an electronic apparatus equipped with a rotatable-swingable input device according to a first embodiment of the present invention viewed from a rear side.

FIG. 1 is a perspective view of a digital camera as an electronic apparatus equipped with a rotatable-swingable input device according to a first embodiment of the present invention viewed from a rear side.

As shown in FIG. 1, the digital camera 1 of this embodiment has a lens barrel 2 at the front side and has a display unit 3, such as an LCD that displays an object image formed on an image pickup device (not shown) by light passing through a photographing optical system of the lens barrel 2, at the rear side. An operation dial 5 that constitutes a rotatable-swingable input device 4 is disposed on the right side of the display unit 3 when the digital camera 1 is viewed from the rear side.

For example, a rotating operation of the operation dial 5 is assigned to a function that needs continuous input operations, such as manual focus and white balance. Moreover, a push-button operation by a swinging operation of the operation dial 5 is assigned to a function that is settable by a toggle operation, such as a selection from ON/OFF/AUTO of flash emission, as a combined operation of swinging operations in a plurality of directions and a rotating operation.

Figure 2:
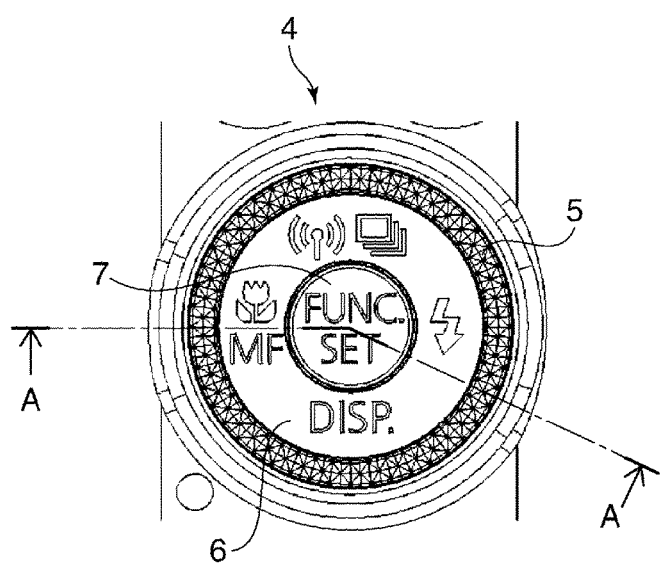
FIG. 2 is an enlarged view of the rotatable-swingable input device shown in FIG. 1 viewed from the side of the operation dial.
Figure 3:
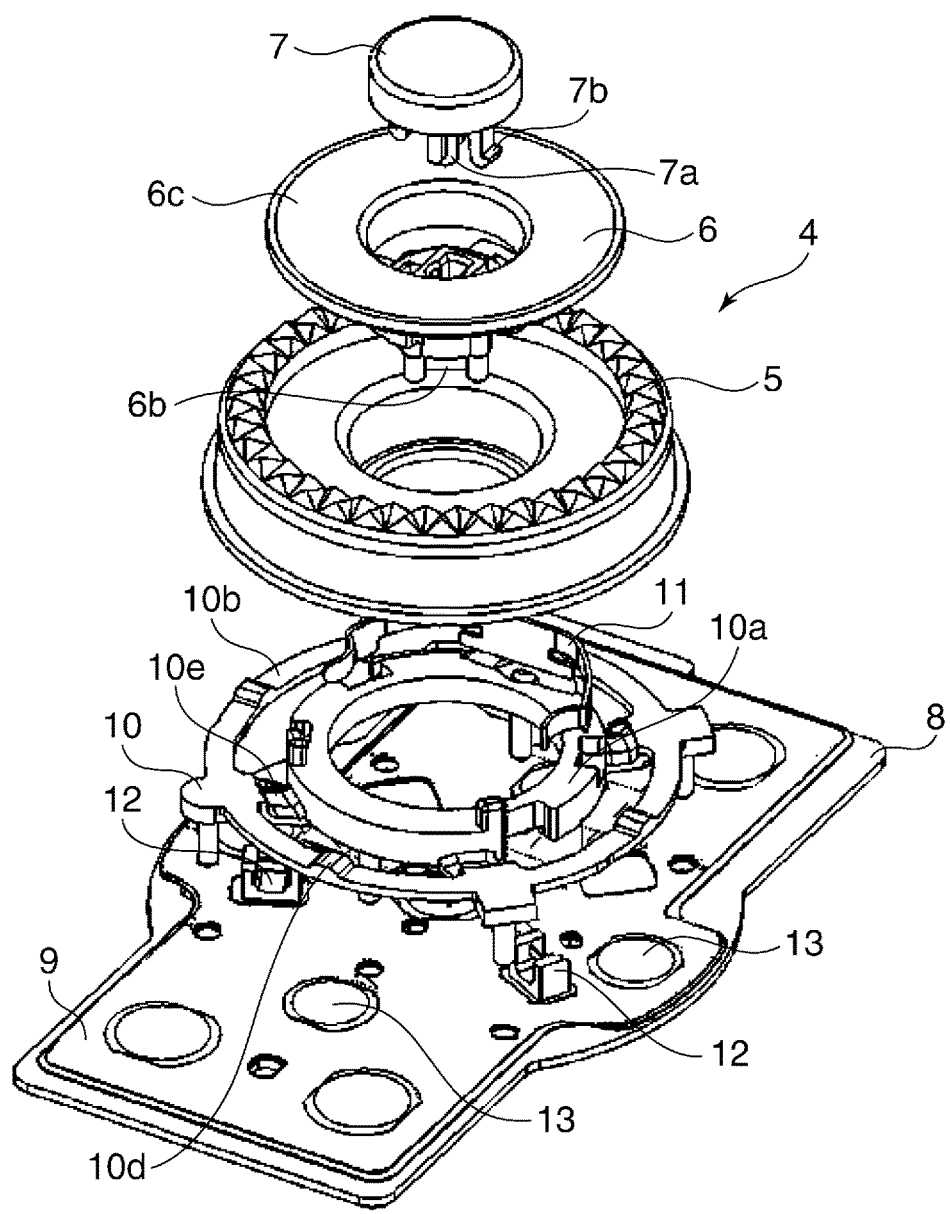
FIG. 3 is an exploded perspective view showing the rotatable-swingable input device shown in FIG. 1.
Figure 4A:
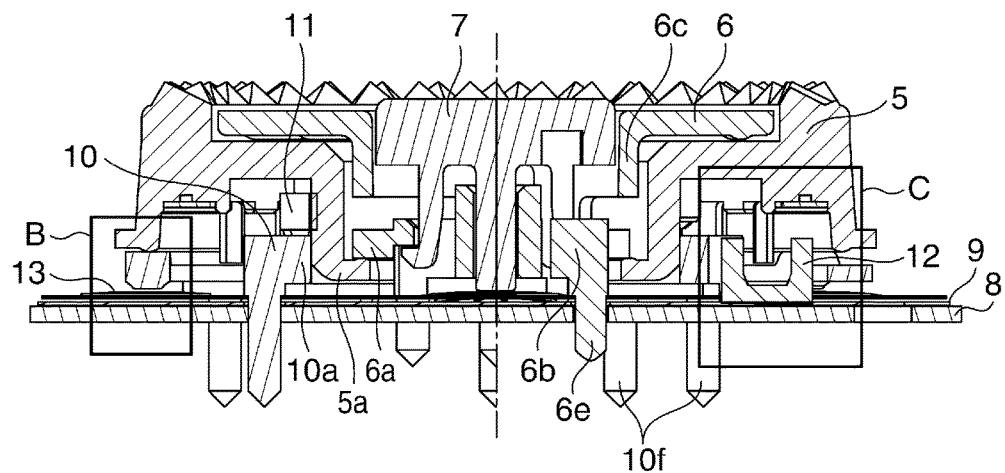
FIG. 4A is a sectional view taken along the line A-A in FIG. 2.
Figure 4B:
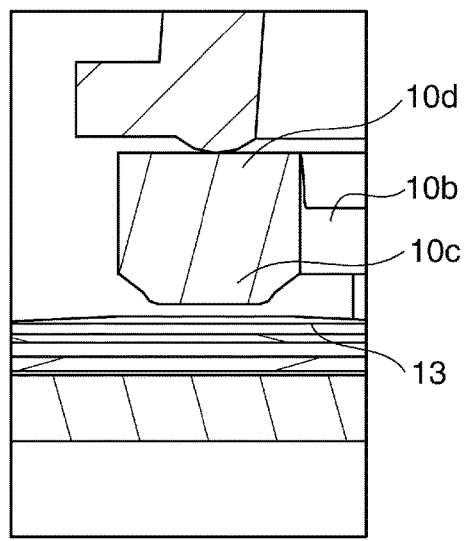
FIG. 4B is an enlarged view of the B section in FIG. 4A.
Figure 4C:
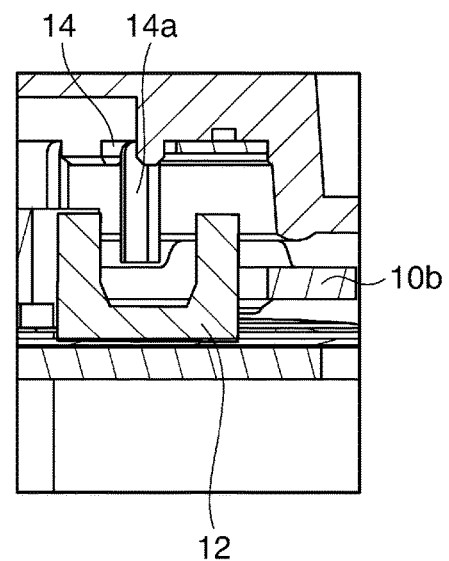
FIG. 4C is an enlarged view of the C section in FIG. 4A.

FIG. 2 is an enlarged view of the rotatable-swingable input device 4 viewed from the side of the operation dial 5. FIG. 3 is an exploded perspective view of the rotatable-swingable input device 4. FIG. 4A is a sectional view taken along the line A-A in FIG. 2. FIG. 4B is an enlarged view of the B section in FIG. 4A. FIG. 4C is an enlarged view of the C section in FIG. 4A.

As shown in FIG. 2, FIG. 3, and FIG. 4A, FIG. 4B, and FIG. 4C, the operation dial 5 is held by a holder 10 so as to be rotationally operatable. Moreover, the operation dial 5 is held by the holder 10 so as to be swingable when the operation dial 5 is push-operated in upper/lower/right/left directions in FIG. 2 as a combined operation. An indication plate 6 is disposed in the center of the operation dial 5.

Icons that indicate respective functions corresponding to the swinging operations in the upper/lower/right/left directions in FIG. 2 are printed on the external surface of the indication plate 6. The indication plate 6 is fixed to a base 8 because pin-shaped caulking parts 6e (see FIG. 4A) are positioned by holes (not shown) of the base 8 and the pin parts of the caulking parts 6e projected to the back side of the base 8 are caulked, which regulates the rotation. A center key 7 is provided in the center of the indication plate 6.

When the operation dial 5 is operated in the upper/lower/right/left swinging directions in FIG. 2, the indication plate 6 swings following the operation dial 5. Moreover, the center key 7 functions as a decision key for various settings, does not follow the operation dial 5 at the times of rotating and swinging of the operation dial 5, and allows a push operation in an axial direction only.

As shown in FIG. 3, a pair of photointerrupters 12 are implemented on a flexible wiring board 9 as transmission optical sensors for detecting rotation of the operation dial 5. A plurality of metal dome switches 13 are integrally held on the surface on which the photointerrupters 12 are implemented. The flexible wiring board 9 is fixed to the base 8 with double-stick tape pasted to the surface opposite to the implementing surface of the photointerrupters 12.

The holder 10 has an inner annular part 10a and outer annular part 10b. The inner annular part 10a holds the operation dial 5 rotatably and swingable in a plurality of directions. The outer annular part 10b is arranged around the inner annular part 10a and is connected to the inner annular part 10a through a plurality of connection parts 10e that are arranged at nearly regular intervals in the circumferential direction. The inner annular part 10a, connection parts 10e, and outer annular part 10b are made from resin material etc. that is elastically deformable.

Four sliding parts 10d that the operation dial 5 slides during the rotation are disposed on the surface of the outer annular part 10b at the side of the operation dial 5 at nearly regular intervals in the circumferential direction. The four slide parts 10d are disposed corresponding to the four metal dome switches 13 at the upper/lower/right/left positions in FIG. 3. Then, four pressure parts 10c (see FIG. 4B) that push the corresponding metal dome switches 13 when the operation dial 5 is swingingly operated in the upper/lower/right/left directions are formed on the back side of the slide parts 10d.

The inner annular part 10a and the outer annular part 10b respectively have caulking parts 10f (see FIG. 4A). The inner annular part 10a and the outer annular part 10b is fixed to the base 8 by inserting the caulking parts 10f into holes of the base 8 and caulking pin parts projected to the back side of the base 8. The inner annular part 10a of the holder 10 holds a click spring 11. The click spring 11 elastically contacts a concavo-convex part (not shown), which consists of a plurality of convex parts and concave parts alternately formed on the back side of the operation dial 5 in the circumferential direction, in order to generate click feeling during rotating operation of the operation dial 5 and to stop the operation dial 5 at a stable position when the operation dial 5 stops.

Moreover, as shown in FIG. 4A, an engagement length of the operation dial 5 that is held by the inner annular part 10a of the holder 10 with respect to the inner annular part 10a in a rotation axis direction is fewer than the overall length of a rotating shaft. Accordingly, the operation dial 5 is held by the inner annular part 10a of the holder 10 so as to be rotatable and swingable. Moreover, as shown in FIG. 4C, it is comparatively formed with thin meat and elastic deformation of the right of FIG. 4 A of the outer annular part 10b of the holder 10 is attained.

On the other hand, the left side portion of the outer annular part 10b of the holder 10 in FIG. 4A is formed in relatively thick because the slide part 10d that the operation dial 5 slides and the pressure part 10c that pushes the metal dome switch 13 are disposed as shown in FIG. 4B.

Moreover, a shading blade 14 that is made from metal material etc. is fixed to the operation dial 5 by adhesion etc. as shown in FIG. 4C, and the shading blade 14 is rotatable and swingable together with the operation dial 5. The shading blade 14 has a plurality of shading parts 14a at nearly regular intervals in the circumferential direction.

Then, when the operation dial 5 is rotationally operated, the shading part 14a and a gap between the adjacent shading parts 14a pass through a space between a light projecting section and light receiving section of the photointerrupter 12 alternately, which repeats transmission and shading of light from the light projecting section of the photointerrupter 12.

The rotation amount of the operation dial 5 is detected on the basis of the output signal from the photointerrupter 1 at that time. Moreover, the pair of photointerrupters 12 implemented on the flexible wiring board 9 is arranged between the inner annular part 10a and the outer annular part 10b so that the waveforms of the output signals differ in a half phase. This enables to detect the rotation direction of the operation dial 5, too.

It should be noted that the number of the shading parts 14a corresponds to the number of the convex parts of the concavo-convex part (not shown) at the back side of the operation dial 5 with which the click spring 11 is engaged. Accordingly, the output of the photointerrupter 12 when the operation dial 5 stops always becomes constant. Moreover, there is a clearance between the photointerrupter 12 and the shading part 14a of the shading blade 14 so as not to contact mutually at the time of a swinging operation of the operation dial 5.

Moreover, the indication plate 6 has a flange-shaped swinging part 6c arranged at an external appearance side and a fixing part 6b arranged at the side of the base 8. The swinging part 6c and the fixing part 6b are connected with two connection parts (not shown). The connection parts are formed so as to enable elastic deformation. And accordingly, the swinging part 6c is swingable in a plurality of arrow directions (the upper/lower/right/left directions in FIG. 2) in the state where the indication plate 6 is fixed to the base 8.

The four pin-shaped caulking parts 6e is disposed in the fixing part 6b. The caulking parts 6e are positioned by the holes of the base 8 and the pin parts of the caulking parts 6e projected to the back side of the base 8 are caulked and fixed to the base 8, as mentioned above. Accordingly, the rotation of the indication plate 6 is regulated.

Moreover, four locking parts 6a are disposed on the fixing part 6b at nearly regular intervals in the circumferential direction. The locking parts 6a are positioned at edges of the connection parts at the side of the fixing part 6b near the caulking parts 6e. The locking parts 6a are respectively arranged at the positions inside the four pressure parts 10c of the outer annular part 10b in the radial directions in the approximately same phases of the four pressure parts 10c. Furthermore, the four locking parts 6a are respectively arranged near the caulking parts 6e at the side of the fixing part 6b, and become firmer.

Then, as shown in FIG. 4A, a projecting part 5a projected inward in the radial direction is disposed on an inner periphery of the bottom portion of the cylindrical rotating shaft of the operation dial 5. The four locking parts 6a of the indication plate 6 respectively contact with the upper surfaces (the surfaces at the external appearance side) of the projecting parts 5a. This enables the swinging part 6c of the indication plate 6 to swing following to a swinging operation of the operation dial 5, and makes the locking parts 6a disposed on the fixing part 6b function as a retainer of the operation dial 5.

The four locking parts 6a are disposed on the indication plate 6e in the upper/lower/right/left directions in FIG. 2, and are arranged at the positions corresponding to the slide parts 10d, pressure parts 10c, and metal dome switches 13. Accordingly, when the operation dial 5 is swingingly operated, the indication plate 6 swings together with the operation dial 5 at the position of the corresponding metal dome switch 13.

Moreover, a hole into which a push shaft of the center key 7 that pushes the metal dome switch 13 is inserted so as to be movable in the axial direction is formed in the center of the fixing part 6b of the indication plate 6. Furthermore, a hole into which a hook of the center key 7 that is snap-fit connected to the fixing part 6b in the vicinity of the locking part 6a is inserted so as to be movable in the axial direction is formed around the hole of the fixing part 6b.

Figure 5:
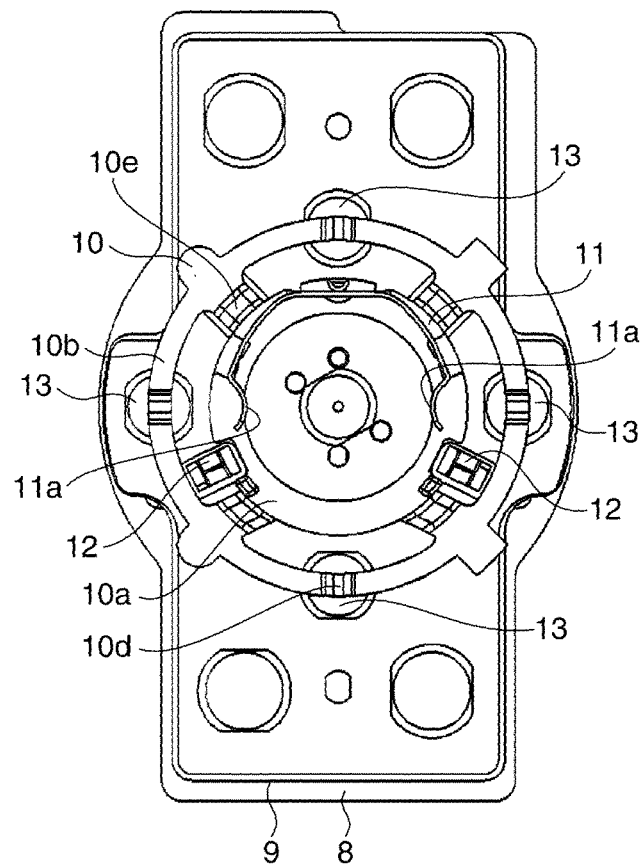
FIG. 5 is a plan view describing a relation between the operation dial, a holder, and a click spring shown in FIG. 3.

Next, the relation between the operation dial 5, holder 10, and click spring 11 will be described with reference to FIG. 5. As shown in FIG. 5, the click spring 11 is formed as a shape of an approximately semicircular arc. The center in the circumferential direction is fixed to the upper side of the inner annular part 10a of the holder 10. The click spring 11 is arranged along the upper side (the external side) of the inner annular part 10a, and has R-shaped parts 11a that are projected inside in the radial direction at the both ends in the circumferential direction. The R-shaped parts 11a elastically contact the concavo-convex part (not shown) that are formed on the back side of the operation dial 5 along the circumferential direction while being energized inside in the radial direction.

Accordingly, when the R-shaped parts 11a contact the convex parts of the concavo-convex part during the rotational operation of the operation dial 5, the convex parts push the R-shaped parts 11a outwardly in the radial direction against the energization force, and the click spring 11 is spread out. When the R-shaped parts 11a face the concave parts of the concavo-convex part, the click spring 11 shrinks and the R-shaped parts 11a engage with the concave parts by the energization force. Accordingly, a click feeling is generated when the operation dial 5 is rotationally operated.

Then, the pair of photointerrupters 12 are arranged in a region that does not overlap with the click spring 11 viewed in the axial direction of the operation dial 5 so as to interpose one of the four metal dome switches 13 (the lower switch in FIG. 5).

As described above, since this embodiment employs the non-contact combination of the shading blade 14 and photointerrupters 12 as a means for detecting the rotation of the operation dial 5, it becomes excellent in the durability and reliability. Moreover, the simple configuration of the shading blade enables miniaturization. Furthermore, since expensive parts are not needed, the device is constituted cheaply. Furthermore, since click feeling of the operation dial 5 is generated by the engagement of the click spring 11 with the concavo-convex part, the satisfactory operational feeling of the operation dial is obtained. As a result, the rotatable-swingable input device 4 with high reliability is achieved at low cost, and the operability of the operation dial 5 is improved.

Next, a digital camera according to a second embodiment of an electronic apparatus equipped with a rotatable-swingable input device of the invention will be described with reference to FIG. 6 through FIG. 9. It should be noted that sections duplicated or corresponding to sections in the above-mentioned first embodiment will be labeled by the same numerals in the drawings, and their descriptions will be omitted.

Figure 6:
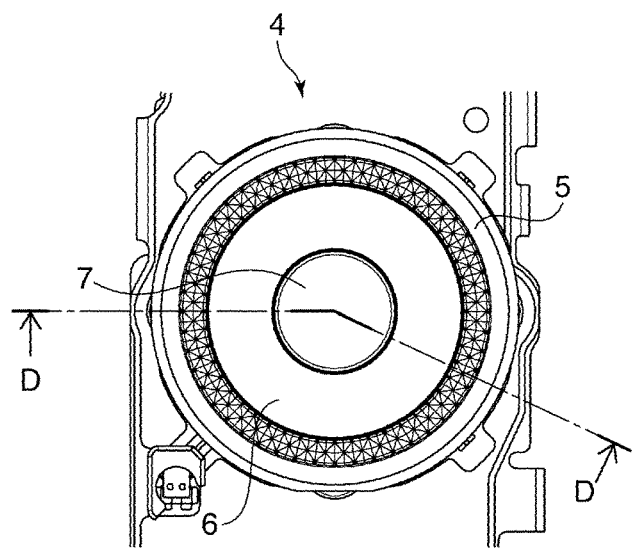
FIG. 6 is an enlarged view of a rotatable-swingable input device viewed from the side of the operation dial in a digital camera as an electronic apparatus equipped with a rotatable-swingable input device according to a second embodiment of the present invention.
Figure 7:
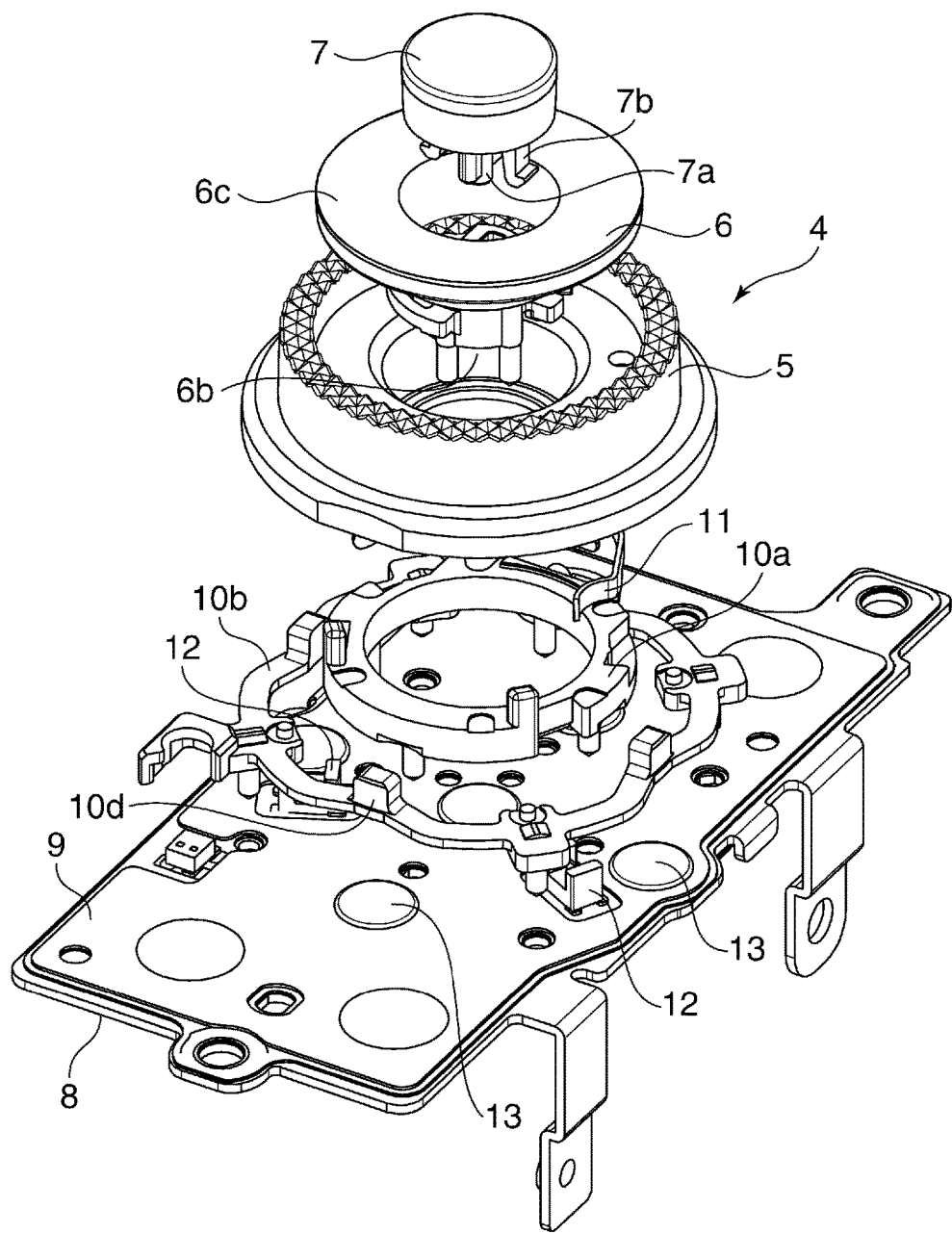
FIG. 7 is an exploded perspective view showing the rotatable-swingable input device shown in FIG. 6.
Figure 8A:
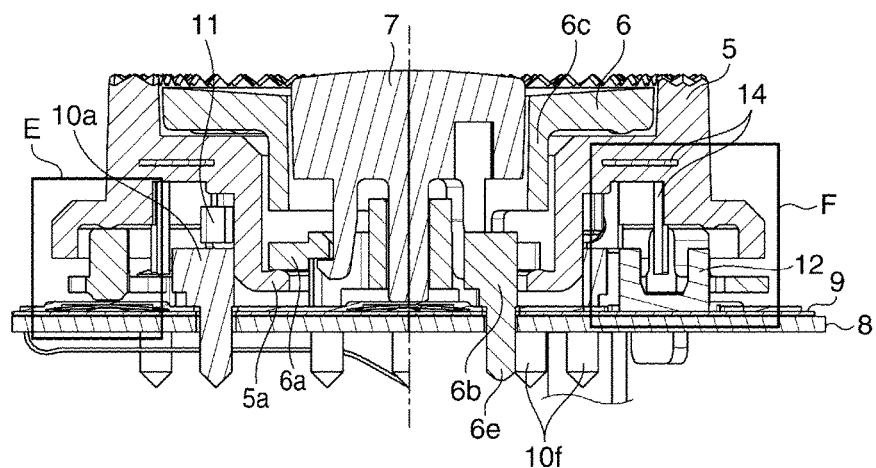
FIG. 8A is a sectional view taken along the line D-D in FIG. 6.
Figure 8B:
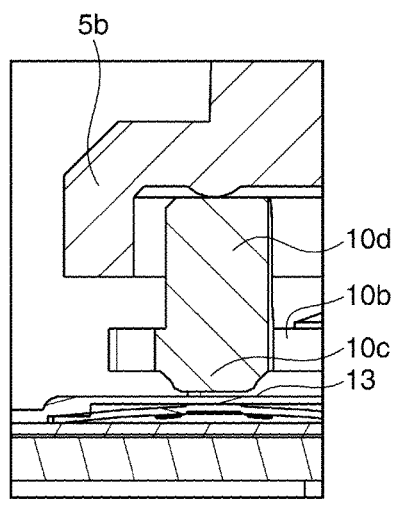
FIG. 8B is an enlarged view of the E section in FIG. 8A.
Figure 8C:
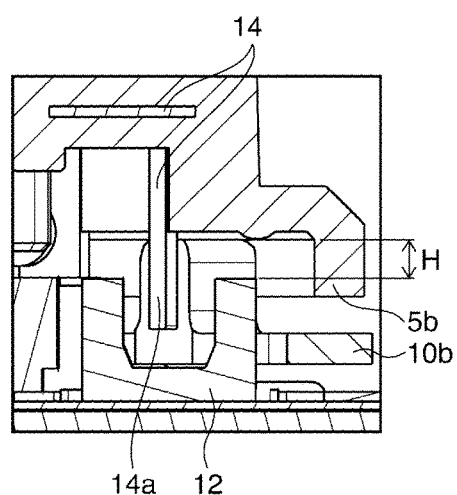
FIG. 8C is an enlarged view of the F section in FIG. 8A.
Figure 9A:
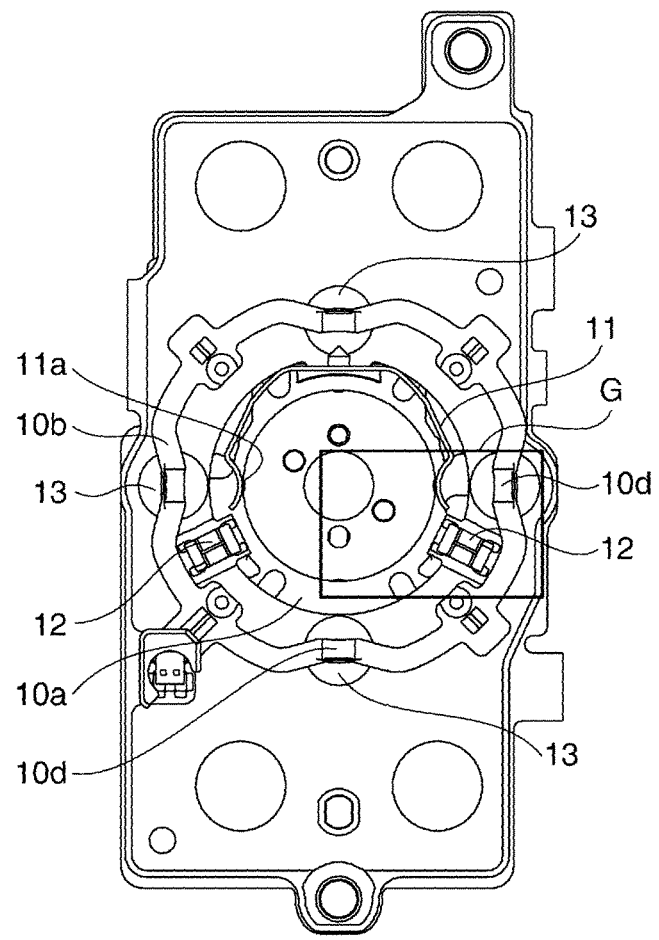
FIG. 9A is a plan view describing a relation between the operation dial, an outer annular part, photointerrupters, and metal dome switches shown in FIG. 7.
Figure 9B:
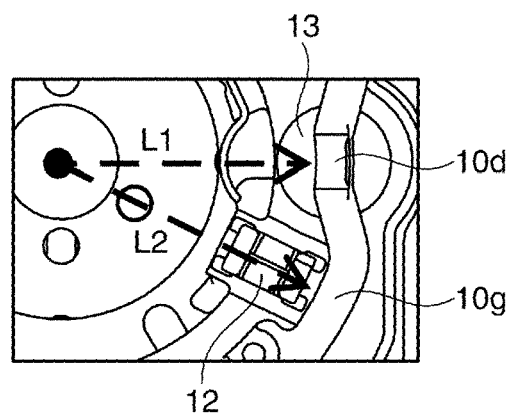
FIG. 9B is an enlarged view of the G section in FIG. 9A.

FIG. 6 is an enlarged view of the rotatable-swingable input device 4 viewed from the side of the operation dial 5. FIG. 7 is an exploded perspective view of the rotatable-swingable input device 4. FIG. 8A is a sectional view taken along the line D-D. FIG. 8B is an enlarged view of the E section in FIG. 8A. FIG. 8C is an enlarged view of the F section in FIG. 8A. FIG. 9A is a view describing a relation between the operation dial 5, outer annular part 10, photointerrupters 12, and metal dome switches. FIG. 9B is an enlarged view of the G section in FIG. 9A.

In this embodiment, the shading blade 14 made from metal is integrally disposed in the operation dial 5 by insert molding as shown in FIG. 8A. Moreover, the slide part 10d provided on the outer annular part 10b is arranged at the position higher than the photointerrupter 12. Then, the height difference H between the slide part 10d and the photointerrupter 12 is larger than the swinging amount of the operation dial 5 when the operation dial 5 is swingingly operated to push the metal dome switch 13 with the pressure part 10c (see FIG. 8C).

Furthermore, as shown in FIG. 9B, a part 10g of the outer annular part 10b at a position corresponding to the photointerrupter 12 in the radial direction is arranged outside the photointerrupter 12 in the radial direction. Moreover, the slide part 10d (the pressure part 10c is disposed on the back side of the slide part 10d) of the outer annular part 10b is arranged inside the part 10g in the radial direction. That is, the distance L1 from the rotation center of the operation dial 5 to the slide part 10d and the pressure part 10c of the outer annular part 10b is shorter than the distance L2 from the rotation center of the operation dial 5 to the part 10g of the outer annular part 10b.

Since the slide part 10d formed in the outer annular part 10b is arranged at the position higher than the photointerrupter 12 in the rotation axis direction of the operation dial 5, and the distance L1 is shorter than the distance L2, the diameter of the operation dial 5 is reduced as a result. It should be noted that the portions of the distance L1 that is shorter than the distance L2 are arranged at the positions of the slide parts 10d and pressure parts 10c, i.e., are arranged at four positions at nearly regular intervals in the circumferential direction corresponding to the metal dome switches 13 pressed by the pressure parts 10c. This keeps uniform operational feeling at the time of the swinging operations of the operation dial 5 in the upper/lower/right/left directions.

Moreover, as shown in FIG. 8B and FIG. 8C, a projecting part 5b projected to the side of the flexible wiring board 9 than the slide part 10d is formed in the outermost part of the operation dial 5 over the whole circumference. This projecting part 5b prevents extraneous light, such as sunlight, from entering to the photointerrupters 12. The other configurations and operational effects are the same as that of the above-mentioned first embodiment.

It should be noted that the inner annular part 10a and outer annular part 10b may be separated or integrated, and the shading part 14a of the shading blade 14 may be directly formed to the operation dial 5. Moreover, the indication plate 6 and center key 7 are not necessarily disposed, and a photoreflector that is a reflection optical sensor may be employed in place of the photointerrupter 12.

Next, a digital camera according to a third embodiment of an electronic apparatus equipped with a rotatable-swingable input device of the invention will be described with reference to FIG. 10 through FIG. 16. It should be noted that the entire configuration of the digital camera is the same as that of the digital camera of the first embodiment shown in FIG. 1. Hereinafter, a rotatable-swingable input device that is a characterizing portion will be described.

Figure 10:
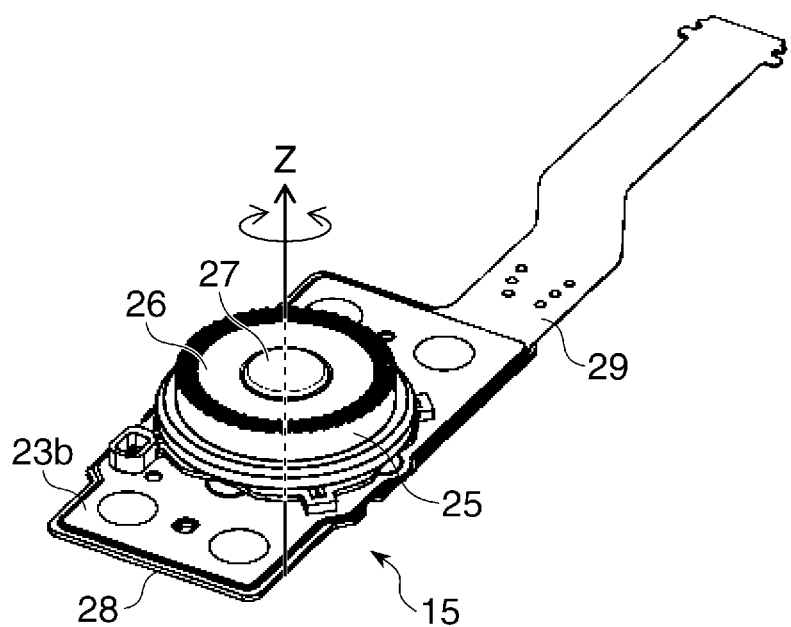
FIG. 10 is a perspective view of a rotatable-swingable input device of a digital camera as an electronic apparatus equipped with a rotatable-swingable input device according to a third embodiment of the present invention.
Figure 11:
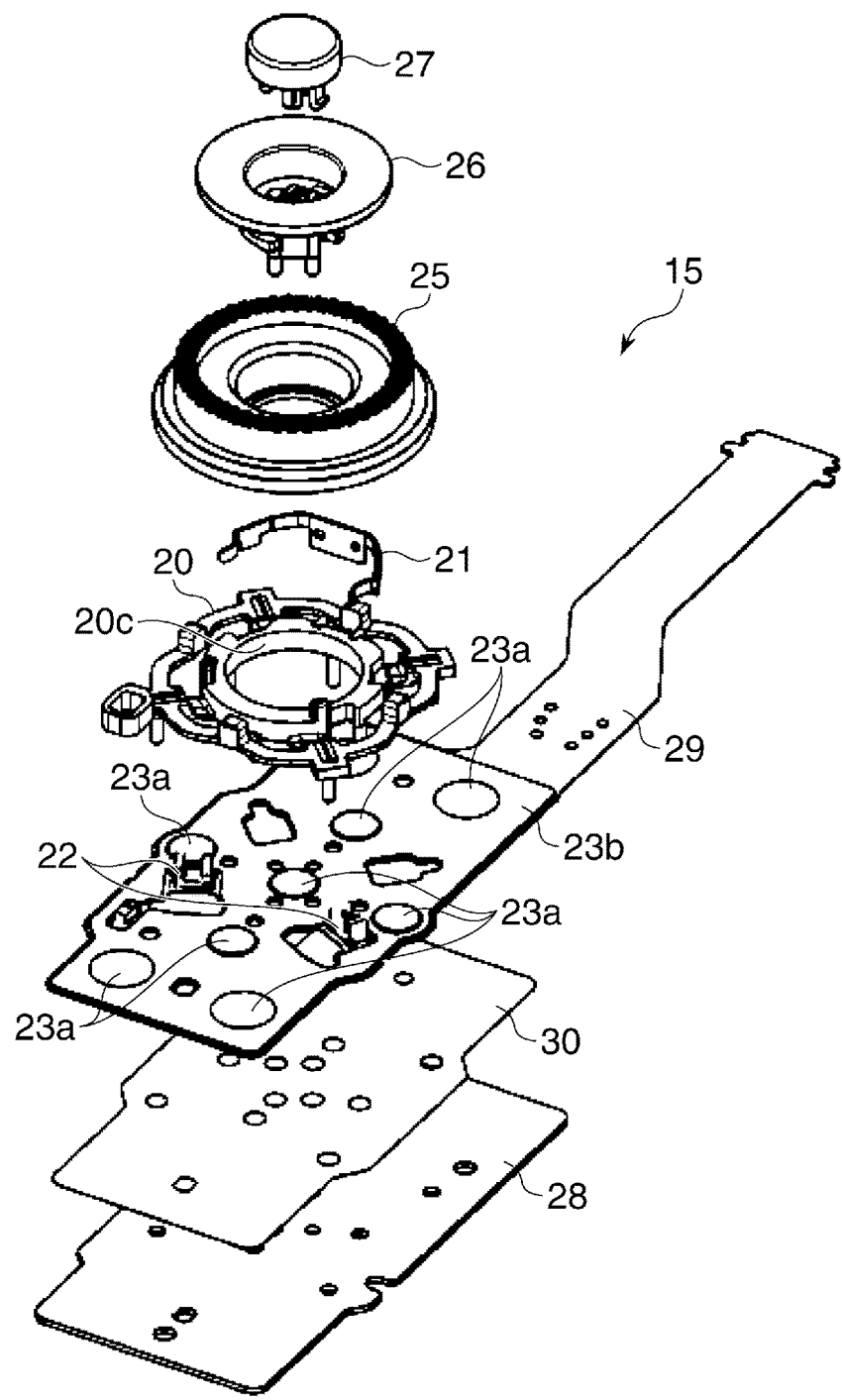
FIG. 11 is an exploded perspective view showing the rotatable-swingable input device shown in FIG. 10.

FIG. 10 is a perspective view showing a rotatable-swingable input device 15 according to the third embodiment. FIG. 11 is an exploded perspective view showing the rotatable-swingable input device 15 shown in FIG. 10.

As shown in FIG. 10 and FIG. 11, an operation dial 25 is held by a holder 20 so as to enable a rotating operation on a Z-axis. Moreover, the operation dial 25 is held by the holder 20 so as to be swingable when the operation dial 25 is push-operated in upper/lower/right/left directions in the drawings as a combined operation. An indication plate 26 is disposed in the center of the operation dial 25.

Icons that indicate button functions in the upper/lower/right/left directions are printed on the external surface of the indication plate 26. The indication plate 26 is positioned by holes of a base, and is fixed to a base 28 by caulking pin parts projected to the back side of the base 28, which regulates the rotation. A center key 27 is disposed in the center of the indication plate 26. The center key 27 is held so as to allow a push operation in the axial direction with respect to the indication plate 26.

When the operation dial 25 is push-operated in each of the upper/lower/right/left directions, the indication plate 26 swings following the operation dial 25. The center key 27 does not interlock with swinging and rotation of the operation dial 25 and merely allows a push operation in the axial direction.

As shown in FIG. 11, a pair of photointerrupters 22 are implemented on a printed circuit board 29 as transmission optical sensors for detecting rotation of the operation dial 25. A sheet switch 23b that integrally holds a plurality of metal dome switches 23a is fixed to the side of the printed circuit board 29 to which the photointerrupters 22 are implemented. Moreover, the printed circuit board 29 is fixed to the base 28 through a double-stick tape 30 that is an example of an adhesive sheet arranged at the side opposite to the surface on which the photointerrupters 22 are implemented.

The holder 20 is positioned by through holes (not shown) of the base 28, and is fixed to the base 28 by caulking pin-shaped caulking parts 20j (see FIG. 14B) projected to the back side of the base 28. The holder 20 holds a click spring 21.

Figure 12A:
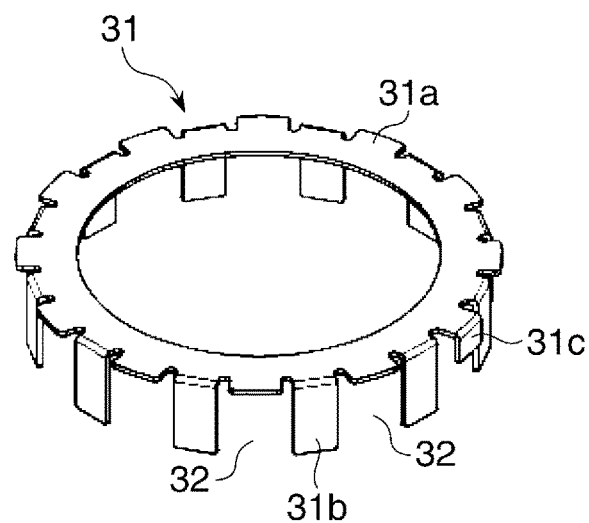
FIG. 12A is a perspective view of a shading blade that is fitted to a back side of the operation dial shown in FIG. 10.
Figure 12B:
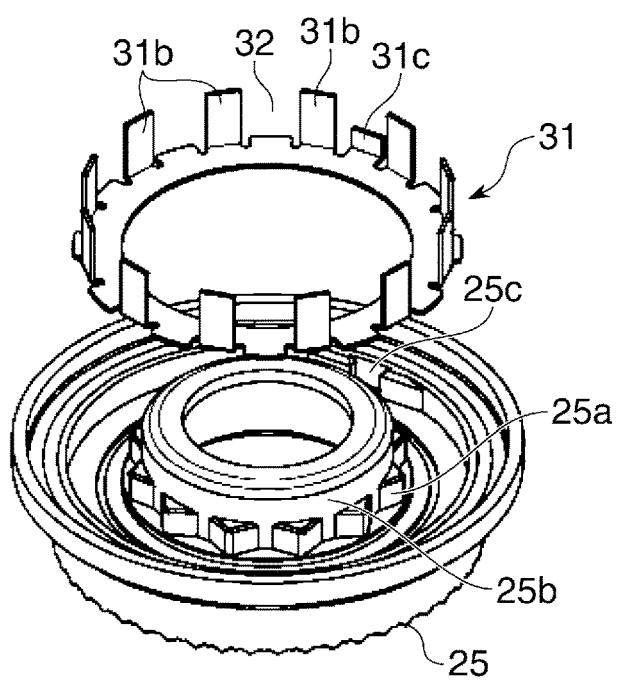
FIG. 12B is a perspective view showing a state where the shading blade shown in FIG. 12A will be attached to the back side of the operation dial.

FIG. 12A is a perspective view of a shading blade 31 that is fitted to a back side of the operation dial 25, and FIG. 12B is a perspective view showing a state where the shading blade 31 will be attached to the back side of the operation dial 25.

The shading blade 31 is made from metal material etc., and has a ring part 31 that is fitted and fixed to a back side of the operation dial 25 so as to rotate together with the operation dial 25 as shown in FIG. 12A. A plurality of shading parts 31b projected in an axial direction of the operation dial 25 are disposed on an outer periphery of the ring portion 31a at nearly regular intervals in a circumferential direction.

When the shading part 31b is positioned in a space between a light projecting section and light receiving section of the photointerrupter 22, light from the light projecting section is shaded. When a gap 32 between the adjacent shading parts 31 in the circumferential direction is positioned in the space, the light from the light projecting section is received by the light receiving section without being shaded. Moreover, a positioning part 31c for positioning to the operation dial 25 is disposed in one gap 32 of the shading blade 31 so as to be projected in the axial direction of the operation dial 25. Since the positioning part 31c is shorter than the shading part 31b in the axial direction, the light from the light projecting section of the photointerrupter 22 is never shaded by the positioning section 31c.

As shown in FIG. 12B, the operation dial 25 has a rotation shaft 25b that is held by a holding hole 20c (see FIG. 11) formed in the holder 20 so as to be rotatable and swingable in a plurality of directions. A plurality of convex parts 25a that are projected outwardly in the radial directions are formed on the outer periphery of the rotation shaft 25b at nearly regular intervals in the circumferential direction.

Contact of the click spring 21 to the convex parts 25a generates a click feeling in the rotating operation of the operation dial 25, and keeps the operation dial 25 at a stable position when the operation dial 25 stops. Moreover, the operation dial 25 has a notch section 25c to which the positioning part 31c of the shading blade 31 is positioned and fitted.

Figure 13A:
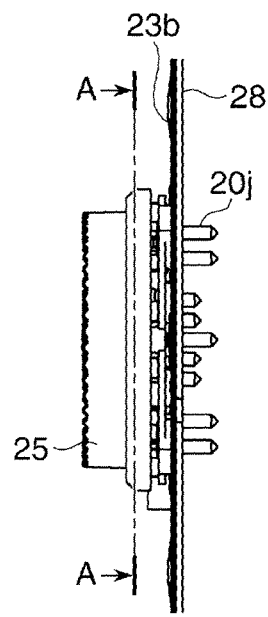
FIG. 13A is a side view of the rotatable-swingable input device in the stable position where the rotation of the operation dial shown in FIG. 10 stops.

Next, the relationship between the shading blade 31 and the photointerrupters 22 in the stable position where the rotation of the operation dial 25 stops will be described with reference to FIG. 13A and FIG. 13B. FIG. 13A is a side view of the rotatable-swingable input device 14 in the stable position where the rotation of the operation dial 25 stops, and FIG. 13B is a sectional view taken along the line A-A in FIG. 13A.

Figure 13B:
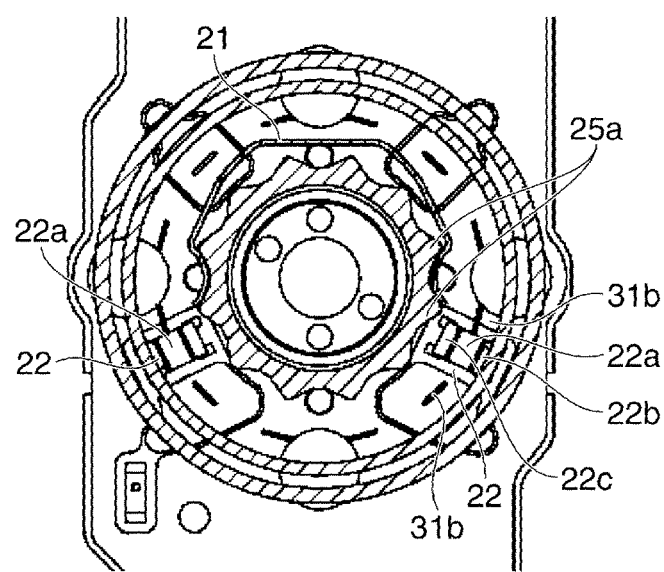
FIG. 13B is a sectional view taken along the line A-A in FIG. 13A.

As shown in FIG. 13B, both ends of the click spring 21 respectively engage with spaces between the adjacent convex parts 25a. Namely, the slant faces of the convex parts 25a adjacent in the circumferential direction make the click spring 21 generate spring force that resists the rotation of the operation dial 25, and accordingly, the operation dial 25 is in the stable position where the rotation stops. At this time, the shading part 31b of the shading blade 31 is not located in a space 22a between a light projecting section 22c and light receiving section 22b of the photointerrupter 22. In this state, the light from the light projecting section 22c of the photointerrupter 22 is received by the light receiving section 22b, without being shaded.

When the shading blade 31 rotates with the operation dial 25, the shading part 31b and gap 32 pass the space 22a between the light projecting section 22c and light receiving section 22b of the photointerrupter 22 alternately, which repeats transmission and shading of light from the light projecting section of the photointerrupter 22. The rotation amount of the operation dial 25 is detected on the basis of the output signal from the photointerrupter 22 at that time. It should be noted that the pair of photointerrupters 22 implemented on the printed circuit board 29 are arranged so that the waveforms of the output signals differ in a half phase. Accordingly the rotation direction of the operation dial 25 is also detectable.

Figure 14A:
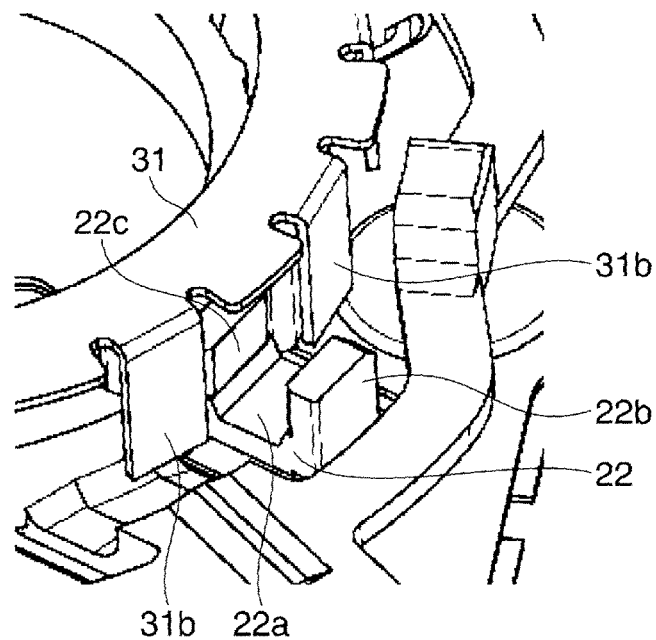
FIG. 14A is a perspective view of a main part describing a relation between the shading blade and photointerrupter in the stable position where the rotation of the operation dial shown in FIG. 10 stops.

FIG. 14A is a perspective view of a main part describing a relation between the shading blade 31 and photointerrupter 22 in the stable position where the rotation of the operation dial 25 stops. As shown in FIG. 14A, the shading part 31b of the shading blade 31 is not located in the space 22a between the light projecting section 22c and light receiving section 22b of the photointerrupter 22 in the stable position where the rotation of the operation dial 25 stops. Even when the operation dial 25 is swingingly operated in this state, the light from the light projecting section 22c of the photointerrupter 22 is received by the light receiving section 22b without being shaded.

Figure 14B:
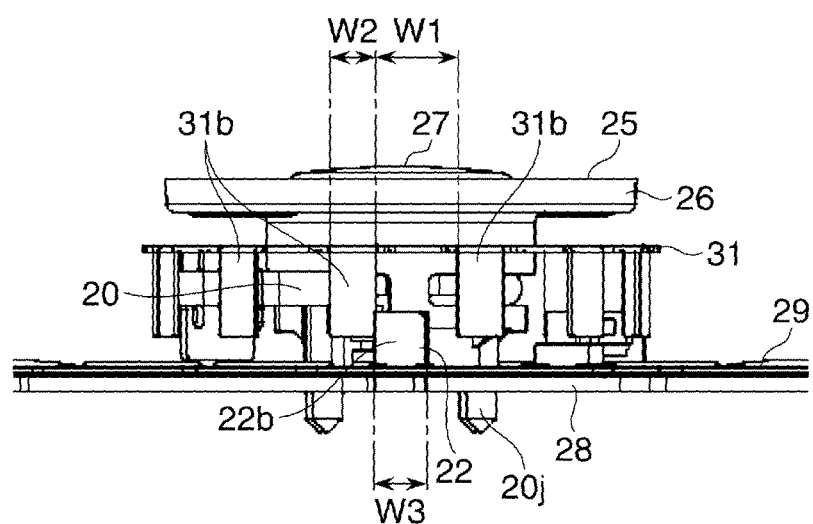
FIG. 14B is a side view describing the relation between the photointerrupter and shading blade in the stable position where the rotation of the operation dial shown in FIG. 10 stops.

FIG. 14B is a side view describing the relation between the photointerrupter 22 and shading blade in the stable position where the rotation of the operation dial 25 stops. The stable position where the rotation of the operation dial 25 stops may be deviated owing to a phase shift of the shading blade 31 with respect to the operation dial 25 or a position shift of the convex parts 25a with respect to the click spring 21 etc.

In this embodiment, as shown in FIG. 14B, a circumferential width W1 of the gap 32 between the adjacent shading parts 31b is wider than a circumferential width W2 of the shading part 31b. Moreover, the circumferential width W1 is wider than a circumferential width W3 of the light projecting section 22c and light receiving section 22b of the photointerrupter 22.

Accordingly, even if the phase shift of the shading blade 31 with respect to the operation dial 25 or the position shift of the convex parts 25a with respect to the click spring 21 occurs, these shifts are absorbable. This stably maintains the state where the light from the light projecting section 22c of the photointerrupter 22 is received by the light receiving section 22b without being shaded in the stable position where the rotation of the operation dial 25 stops. As a result, misdetection at the time of the rotating operation and swinging operation of the operation dial 25 is prevented.

Figure 15A:
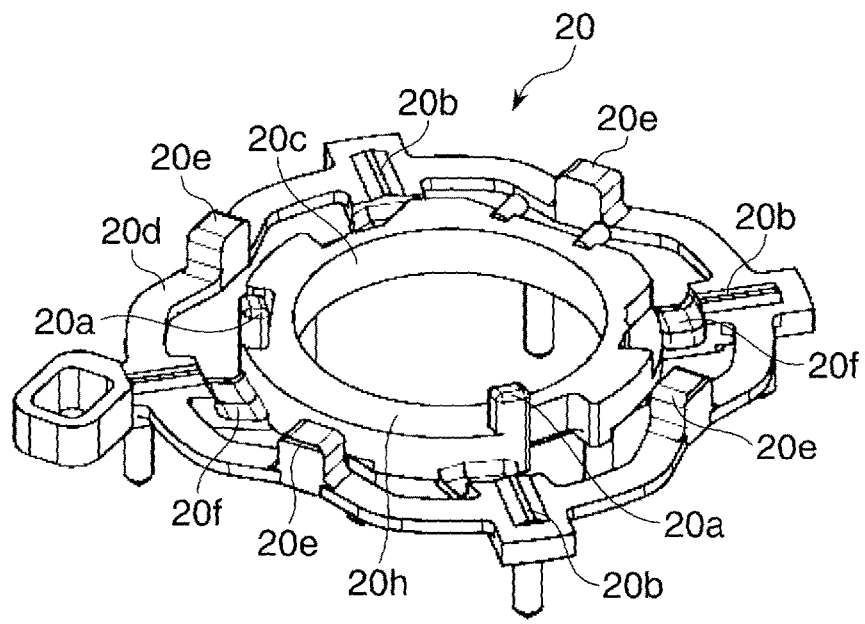
FIG. 15A is a perspective view showing the holder shown in FIG. 11 viewed from the side of the operation dial.

FIG. 15A is a perspective view showing the holder 20 viewed from the side of the operation dial 25. As shown in FIG. 15, the holder 20 is provided with an inner annular part 20h that has a holding hole 20c that holds the rotation shaft 25b of the operation dial 25 so as to be rotatable and swingable in a plurality of directions. An outer annular part 20d is arranged outside the inner annular part 20h. The inner annular part 20h and outer annular part 20d are connected through four connection parts 20f arranged at nearly regular intervals in the circumferential direction. The inner annular part 20h, connection parts 20f, and outer annular part 20d are formed integrally and made from resin material etc. that is elastically deformable.

Four slide parts 20d that the operation dial 25 slides during the rotation are disposed on the surface of the outer annular part 20d at the side of the operation dial 25 at nearly regular intervals in the circumferential direction. The four slide parts 20e are disposed corresponding to the four metal dome switches 23a, which are arranged at the upper/lower/right/left positions in the center area, among the plurality of metal dome switches 23a shown in FIG. 11. Then, the slide parts 20e function as pressure parts that push the corresponding metal dome switches 23 when the operation dial 25 is swingingly operated in the upper/lower/right/left directions.

First contact parts 20b are disposed on the outer annular part 20d as stoppers for the operation dial 25 in the swinging directions. The first contact parts 20b are disposed at four positions at nearly regular intervals in the circumferential direction in the same phase as the connection parts 20f and in the phase difference of 45 degrees from the slide parts 20e. The two of four first contact portions 20b are respectively arranged near the photointerrupters 22. In the same manner, a pair of second contact parts 20a are disposed on the inner annular part 20h near the photointerrupters 22, respectively, as stoppers for the operation dial 25 in the swinging directions. Although the case where the outer annular part 20d and the inner annular part 20h are integrally formed is exemplified in this embodiment, the outer annular part 20d and the inner annular part 20h may be different bodies.

Figure 15B:
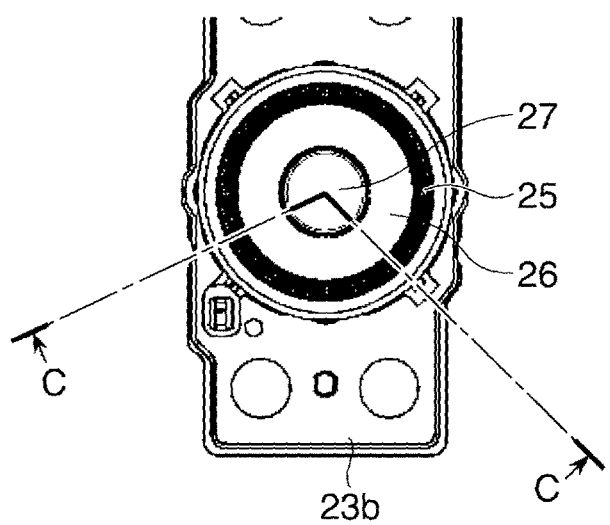
FIG. 15B is a plan view of a main part of the rotatable-swingable input device viewed from the side of the operation dial in the stable position where the rotation of the operation dial shown in FIG. 10 stops.
Figure 16:
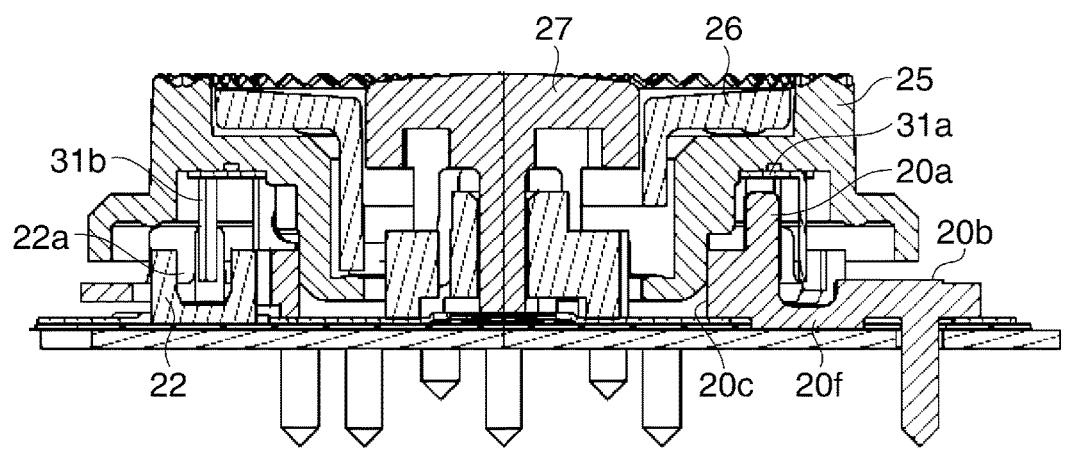
FIG. 16 is a sectional view taken along the line C-C in FIG. 15B.

FIG. 15B is a plan view of a main part of the rotatable-swingable input device 14 viewed from the side of the operation dial 25 in the stable position where the rotation of the operation dial 25 stops. FIG. 16 is a sectional view taken along the C-C line in FIG. 5B.

As shown in FIG. 16, the second contact part 20a disposed on the inner annular part 20h will contact with the ring portion 31a of the shading blade 31 when the operation dial 25 is swingingly operated. That is, the second contact part 20a has a function of a stopper for the operation dial 25 in the swinging direction. Moreover, the outer peripheral edge of the operation dial 25 will contact with the first contact part 20b that has the function of the stopper for the operation dial 25 in the swinging direction similarly. That is, since the holder 20 is provided with the first and second contact parts 20b and 20a that will contact with the operation dial 25 at the outside and inside of the shading part 31b when the operation dial 25 is swingingly operated in regions near the photointerrupters 22, the swinging operation of the operation dial 25 is regulated so that the shading part 31b does not displace more than a predetermined amount.

Moreover, a gap between the front end of the shading part 31b of the shading blade 31 and the opposite surface (bottom surface) of the space 22a of the photointerrupter 22 is larger than a gap between the second contact part 20a and ring portion 31a of the shading blade 31, and a gap between the first contact part 20b and outer peripheral edge of the operation dial 25. As a result, even if the phase shift of the operation dial 25 in the rotation direction occurs and the operation dial 25 is swingingly operated when the shading part 31b is located in the space 22a of the photointerrupter 22, the shading part 31b does not interfere with the photointerrupter 22.

As described above, this embodiment enables to stably maintain the state where the light receiving section 22b of the photointerrupter 22 receives the light even when the stable position where the rotation of the operation dial 25 stops deviates. As a result, misdetection at the time of the rotating operation and swinging operation of the operation dial 25 is prevented.

Moreover, in this embodiment, even if the operation dial 25 is swingingly operated when the shading part 31b is located in the space 22a of the photointerrupter 22 due to the phase shift of the operation dial 25 in the rotation direction, the shading part 31b does not interfere with the photointerrupter 22.

It should be noted that the present invention is not limited to what has been described in the above-mentioned embodiment, quality of the material, shape, size, formation, the number of elements, arrangement locations, etc., can be changed suitably unless it is deviated from the scope of the present invention.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2015-215758 and No. 2015-215757, filed Nov. 2, 2015, which are hereby incorporated by reference herein in their entireties.

What is claimed is:

1. A rotatable-swingable input device comprising:
a plurality of optical sensors disposed on a wiring board each of which comprises a light projecting section and a light receiving section that receives a light flux emitted from the light projecting section;
an operation member that enables a rotating operation and swinging operations in a plurality of directions;
a plurality of switches that are disposed on the same side of the wiring board where said optical sensors are arranged, each of the switches generating a signal when being pressed by a swinging operation of said operation member; and
a shading member that has a plurality of shading parts that are arranged in a circumferential direction and pass a space between the light projecting section and the light receiving section when said operation member is rotationally operated,
wherein the shading parts do not positioned in the space in a rotation stop position of said operation member, and
wherein a circumferential width of a gap between the shading parts adjacent in the rotation direction is wider than a circumferential width of the space of each of said optical sensors.

2. The rotatable-swingable input device according to claim 1, further comprising a click mechanism that generates click feeling when said operation member is rotationally operated, and stops said operation member at a stable position when rotation of said operation member unit stops.

3. The rotatable-swingable input device according to claim 1, wherein a circumferential width of a gap between the shading parts adjacent in the rotation direction is wider than a circumferential width of each of the shading parts.

4. The rotatable-swingable input device according to claim 1, further comprising an elastically deformable holder that is disposed on the same side of the wiring board and holds said operation member with said shading member so as to be rotatable and swingable,
wherein said holder is provided with an inner annular part that holds said operation member and said shading member so as to be rotatable and swingable in the plurality of directions, and an outer annular part that is arranged outside the inner annular part and has pressure parts each of which deforms elastically and pushes a corresponding switch among the plurality of switches when said operation member is swingingly operated in one direction among the plurality of directions, and
wherein a contact part that contacts with said operation member before one of the shading parts of said shading member contacts with the space of one of said optical sensors is disposed at one of a position on the inner annular part inside the shading parts of said shading member and a position on the outer annular part outside the shading parts of said shading member.

5. The rotatable-swingable input device according to claim 1, further comprising an elastically deformable holder that is disposed on the same side of the wiring board and holds said operation member with said shading member so as to be rotatable and swingable,
wherein said holder is provided with an inner annular part that holds said operation member and said shading member so as to be rotatable and swingable in the plurality of directions, and an outer annular part that is arranged outside the inner annular part and has pressure parts each of which deforms elastically and pushes a corresponding switch among the plurality of switches when said operation member is swingingly operated in one direction among the plurality of directions, and
wherein said optical sensors are disposed between the inner annular part and the outer annular part.

6. An electronic apparatus equipped with a rotatable-swingable input device, the rotatable-swingable input device comprising:
a plurality of optical sensors disposed on a wiring board each of which comprises a light projecting section and a light receiving section that receives a light flux emitted from the light projecting section;
an operation member that enables a rotating operation and swinging operations in a plurality of directions;
a plurality of switches that are disposed on the same side of the wiring board where said optical sensors are arranged, each of the switches generating a signal when being pressed by a swinging operation of said operation member; and
a shading member that has a plurality of shading parts that are arranged in a circumferential direction and pass a space between the light projecting section and the light receiving section when said operation member is rotationally operated;
wherein the shading parts do not positioned in the space in a rotation stop position of said operation member, and
wherein a circumferential width of a gap between the shading parts adjacent in the rotation direction is wider than a circumferential width of the space of each of said optical sensors.

* * * * *